United States Patent [19]

McCann, III

[11] 4,001,143

[45] Jan. 4, 1977

[54] CATALYST PREPARATION
[75] Inventor: Elrey L. McCann, III, Wilmington, Del.
[73] Assignee: E. I. Du Pont de Nemours and Company, Wilmington, Del.
[22] Filed: Apr. 8, 1975
[21] Appl. No.: 566,110
[52] U.S. Cl. .............................. 252/462; 423/213.5
[51] Int. Cl.² ............................................ B01J 23/10
[58] Field of Search ............... 252/462; 423/213.5, 423/593

[56]         References Cited
         UNITED STATES PATENTS

| | | | |
|---|---|---|---|
| 3,780,126 | 12/1973 | Manning | 252/471 X |
| 3,900,428 | 8/1975 | Mai et al. | 252/462 |
| 3,901,828 | 8/1975 | Mai et al. | 252/462 |

FOREIGN PATENTS OR APPLICATIONS 1,352,995  5/1974  United Kingdom ............... 252/462

Primary Examiner—W. J. Shine

[57]            ABSTRACT

Catalysts useful for oxidizing carbon monoxide and other volatile carbon compounds and for reducing nitrogen oxides are prepared by heating reactive alumina impregnated with ions of a platinum metal, a lanthanide metal, and at least one alkali or alkaline earth metal in amounts which promote substantially complete incorporation of the platinum metal into an aluminum-containing complex metal oxide of the empirical formula $ABO_3$.

5 Claims, No Drawings

CATALYST PREPARATION

BACKGROUND OF THE INVENTION

In recent years, the development of heterogeneous platinum-metal catalysts has advanced markedly. Efforts have been directed toward producing effective catalysts for reducing atmospheric pollution by industrial processes as well as atmospheric pollution by exhaust gases from internal combustion engines.

Many processes have been suggested for making catalysts containing platinum metals. However, these catalysts are frequently thermally and chemically unstable in use and the preparation of a catalyst and placing it in a form suitable for use in industrial or automotive applications is often an extended, multi-stage operation. A continuing need therefore exists for more efficient methods of preparing stable catalysts than have heretofore been available.

SUMMARY OF THE INVENTION

The present invention provides a process for preparing a catalyst comprising impregnating reactive alumina with a solution comprising ions of A. at least one platinum metal in a concentration sufficient to impart to the alumina about 0.001% to 5% by weight of the platinum metal;

B. at least one lanthanide metal of atomic number 57 to 71, inclusive, in an atomic amount between about 1 and 1000 times the atomic amount of the platinum metal; and C. at least one metal selected from alkali and alkaline earth metals having ionic radii between about 0.9 and 1.65 Angstroms, in an atomic amount of about from 0.25 to 4 times the atomic amount of the platinum metal; and heating the resulting impregnated alumina at a temperature of at least about 800° C. for at least about one hour.

DETAILED DESCRIPTION OF THE INVENTION

The metal oxides resulting from the present process have the general formula $ABO_3$ and therefore contain substantially equivalent amounts of one or more metals of a Type A and one or more metals of a Type B along with oxygen in an atomic amount about three times the atomic amounts of the metals of Type A and of the metals of Type B. The metal ions used in the present process are incorporated into this structure with the lanthanide, alkali and alkaline earth metals as metals of Type A; while the platinum metal ions, together with aluminum from the reactive alumina, are present as metals of Type B. The quantities and valences of the several components are adjusted so that the total valence charge of the cations of all the metals of Type A and of Type B substantially equals the valence charge of the oxygen in the formula.

Thus, the complex metal oxides containing aluminum and platinum metals obtained by the process of this invention contain aluminum derived from the impregnated reactive alumina and such oxides are presumed to be formed in and on and to remain associated with the alumina. As is recognized in the field of inorganic oxides, the crystal structures of oxides of the types represented by the above empirical formulas can contain slight excesses or deficiencies of any of the component metals and/or oxygen and remain intact.

The platinum metals used in the instant process are selected from platinum, palladium, osmium, iridium, rhodium and ruthenium. Of these, platinum and ruthenium are preferred because of the superior catalytic performance of the catalysts resulting from these platinum metals.

The amount of platinum metal with which reactive alumina is impregnated in the process of this invention should contribute significantly to the catalytic properties of the alumina and any associated materials. The quantity of platinum metal is therefore at least about 0.001% by weight of the reactive alumina, and increased catalytic effect is realized at a level of at least about 0.01%. Particularly desirable catalytic effect is realized at a platinum metal concentration of about from 0.05 to 1.0% of the weight of reactive alumina impregnated. While larger amounts of the platinum metals, for example, 5 % or more, can be used, a decreasing incremental improvement in catalytic properties has been observed with successive increases in the concentration of platinum metal.

The lanthanide metals used in the instant process generally have a valence of +3 and are considered Type A metals in the $ABO_3$ structure believed to be formed in the process. Lanthanum itself or a mixture of the lanthanide rare earth metals have been found especially satisfactory. A typical rare earth mixture contains about one-half cerium, one-third lanthanum, one-sixth neodymium, and smaller amounts of the remaining metals of atomic number 57–71 or a similar mixture from which a major part of the cerium has been removed. Cerium can also be present in the product of this process in valence +3.

Considering the relatively large amount of reactive alumina impregnated relative to the amount of the platinum metals, the +3 valence of aluminum, and the typical +2, +3 or +4 valence of the platinum metals, the reactive alumina can be impregnated in this process with a relatively large amount of lanthanide metals having a valence +3. Thus the relative alumina is preferably impregnated with atomic amounts of those metals between about 1 and 1000 times the atomic amount of the platinum metals. Preferably the reactive alumina is impregnated with between about 4 and 40 times the atomic amount of the platinum metal. The minimum amount of lanthanide metal preferably is sufficient, together with the alkali and alkaline earth metals of Type A, to promote substantially complete incorporation of the platinum metals into aluminum-containing complex oxides of the formula $ABO_3$ having a desired percentage distribution of the various components in the A sites and the B sites. This is generally at least about 90% of the amount stoichiometrically required by the formula $ABO_3$ and more preferably the maximum amount of such metals is less than about 10 times the minimum amount. Little benefit in catalytic properties is obtained from impregnating the reactive alumina with excess metals of Type A having valence +3.

The alkali and alkaline earth metals used in the present process occupy sites of Type A in the resulting products. They generally exhibit valences +1 and +2 and belong to Groups 1A and 2A of the periodic table. An important property of the metals of Type A incorporated into the catalysts resulting from the present process is the radii of their ions. To conform to the oxide structure, the ionic radii should be about from 0.9 to 1.65 Angstroms, and preferably about from 1.1 and 1.5 Angstroms. Ionic radii have been tabulated by Shannon and Prewitt in Acta Cryst., Volume B25, page 925*ff* (1969), and Volume B26, page 1046*ff* (1970).

Metals selected from potassium, strontium, and barium have been found to be particularly convenient to incorporate by the present process and form products of excellent catalytic activity. These metals are therefore preferred.

The alkali and alkaline earth metals having valence +1 and +2 are used in this process in relative amounts which are smaller than the amount of the metals having valence +3. These metals are generally present in atomic amounts which are about 0.25 to 50 times the atomic amounts of the platinum metals. With metals having valence +1, the reactive alumina is generally impregnated with about 0.5 to 2 times the atomic amount of the platinum metals, while with metals having valence +2, the reactive alumina is generally impregnated with about 1 to 4 times the atomic amount of the platinum metals. With mixtures of metals having valences +1 and +2, the reactive alumina can be impregnated with amounts of the metals having each valence which are in proportion to these indicated amounts. It is preferable that the minimum amount of alkali and alkaline earth metals having valence +1 and +2 is that amount which, considering the valences and amounts of other metals of Type A in the impregnating mixture, is sufficient to promote substantially complete incorporation of the platinum metals into aluminum-containing metal oxides of the formula $ABO_3$, that is, at least about 90% of the amount stoichiometrically required by the formula $ABO_3$. The maximum amount of such metals should generally be less than about 1.5 times the minimum amount. Little catalytic benefit is obtained from impregnating the reactive alumina with excess metals of Type A having valence +1 or +2.

The reactive alumina used in the process of this invention can be any of the high surface area forms of alumina which chemically interact with the lanthanide, alkali, and alkaline earth metals under the conditions of the invention process to form a complex oxide. For instance, the reactive alumina can be a hydrated alumina such as the highly purified alpha alumina monohydrate sold by the Continental Oil Company as "Dispal," the colloidal acicular boehmite (alumina monohydrate) described by Aarons in U.S. Pat. No. 2,915,475 or another similar synthetic boehmite, the alumina trihydrate sold as Alcoa C-333, or the hydrate having one mole of alumina per 0.5 mole of water sold as Alcoa F-1. Preferably the reactive alumina is a partially dehydrated alumina obtained by drying and calcining at 400° C. to 1000° C. or higher a precursor mixture of hydrous alumina containing predominately alumina monohydrate and/or one or more of the trihydrate forms gibbsite, bayerite, and norstrandite. Such calcined aluminas contain significant amounts (e.g., 50% or more) of delta, eta and/or theta-alumina. For example, a preferred reactive alumina is obtained by heating "Dispal" alumina monohydrate at 950° C. from one-half to two hours or longer, during which there is a significant increase in apparent density and a decrease in surface area as determined by the BET method from about 160 to about 80 square meters per gram.

The alumina can optionally be chemically treated to enhance its reactivity or the catalytic properties of the final product. Such treatment can include neutralizing or removing residual materials from the process by which the alumina is prepared.

The reactive alumina can be in any desired shape such as spheres, pills, extrudates, granules, brickettes, and powders, and can be in a low-density spherical form made by the oil-drop method described by Hoekstra in U.S. Pat. No. 2,620,314.

The reactive alumina can be impregnated by techniques known in the art, for example by dipping into or wetting with a solution of metal compounds, separating any excess of the solution, and drying. The amount of metal compounds impregnated into the reactive alumina can be controlled by the concentrations of metal compounds in the solution and by the number of treatments employed. The amount impregnated into the reactive alumina can be estimated from the known amounts of metal compounds in the mixture and the weight or volume of the mixture impregnated and, usually less accurately, from the gain in weight of the reactive alumina after drying under contolled conditions. In general, all components of an impregnating solution are introduced into the reactive alumina in the proportions present in the solution.

The solutions used in impregnating reactive alumina in this process can contain metal compounds of any types which are converted to oxides by prolonged heating in the presence of reactive alumina at the temperatures used in the process. Thus the impregnating solution can be prepared, for example, from salts of carboxylic acids such as acetates, oxalates, and tartrates; salts of the oxy-acids of sulfur such as sulfites, and sulfates; halogen acid salts which are soluble in the desired solvent and are converted to oxides without volatilization such as ruthenium chloride, strontium chlorate, and barium perchlorate, or salts of the oxy-acids of nitrogen such as nitrites and nitrates. Soluble nitrates have been found particularly convenient since platinum metal compounds can be converted into oxides relatively rapidly and at relatively low temperatures by heating in the presence of nitrate salts. Hydrated ruthenium chloride ($RuCl_3 \cdot xH_2O$), chloroplatinic acid and soluble salts thereof, such as $K_2PtCl_6$ are particularly convenient components of impregnating solutions for preparing catalytic compositions containing ruthenium and platinum, respectively.

Generally the impregnating solutions are prepared from water, for reasons of convenience and economy. However, as will be evident to those skilled in the art, other solvents can also be used, such as organic ethers and alcohols.

The solutions used in impregnating reactive alumina supports should contain amounts of compounds of the platinum metals, the lanthanide metals, and the alkali and/or alkaline earth metals in the proportions required to achieve the desired impregnation. Dry reactive alumina powders and porous bodies can absorb between about 3% and 300% by weight of an aqueous solution. Dry alumina powders typically absorb about 50% to 150% by weight. Dry refractory metal supports coated with reactive alumina typically absorb between about 10% and 40% of such solutions. The compositions of impregnating solutions are sometimes limited by the solubility of suitable metal compounds. For example, potassium chloroplatinate is soluble in water at 100° C. to only about 5% by weight. Additional solubilizing ingredients such as acids and complexing agents can be desirable in the preparation of the solutions. The desired degree of impregnation can be obtained by adjusting the composition of the impregnating solution and the amount applied to the alumina.

The reactive alumina can be impregnated in the process of this invention at ambient temperatures, but is preferably impregnated at elevated temperatures, e.g., about from 50° C. to 100° C., because of the shorter times required for complete impregnation of the alumina at the higher temperatures. For example, impregnation times of up to 16 hours at ambient temperatures may be as effective as impregnation times as short as one hour at 95° C. to 100° C.

It has been found preferable to convert one or more metal ions or compounds impregnated into the alumina to insoluble compounds before heating. Such insoluble compounds can be formed by introducing into the alumina an aqueous solution of a precipitant such as a carbonate, sulfide, or hydroxide. A soluble carbonate has been found to be particularly satisfactory for this purpose, since platinum metal anions are converted to oxides more efficiently in the presence of carbonate salts. For example, an alumina containing a precipitant can be impregnated or a dried impregnated alumina can be saturated with or dipped into a solution of sodium, potassium, or ammonium carbonate at such concentration and composition as to promote conversion of at least one impregnated metal compound into a hydroxide, hydrous oxide, and/or carbonate. Such a solution can contain about 10% by weight potassium carbonate. The impregnated reactive alumina is preferably thereafter rinsed substantially free of water-soluble materials when the metal components required for the process of the invention are converted to insoluble compounds. These insolublization procedures are preferred not only because of the promotion of platinum metal oxide formation noted above, but because they simplify multistage impregnations, when desired.

The heating temperatures and times required for formation of complex aluminum-containing metal oxides in impregnated reactive alumina in the process of this invention depend upon the particular metal compounds involved. The impregnated alumina should be heated at a temperature of at least about 800° C. for about one hour or longer, but temperatures of 1000° to 1500° C can be used with increased speeds of formation and no depreciation of the products. Heating at about 950° C. for about 16 hours is preferred. Preferably, when the platinum metal is platinum, the heating is carried out in an oxidizing atmosphere such as air. However, the desired alumina-containing complex oxides can be formed under non-oxidizing conditions when the impregnated alumina contains substantial amounts of oxidizing materials such as nitrate salts.

The products resulting from the present process can be used as catalysts in the form of free-flowing powders, for instance in fluid-bed reaction systems, or in the form of shaped structures providing efficient contact between the catalysts and reactant gases. Such catalyst structures can contain minor or major amounts of catalytically inert materials. These inert materials can be either porous or solid, with the catalytic materials primarily on the surfaces thereof or dispersed throughout. For example, the powdered alumina can be formed into porous pellets, with or without added inert powdered materials, by conventional techniques employing pellet presses, rolling mixers or extruders. Dispersants, lubricants, and binders are often added in the preparation of such pellets.

The products of the present process are also advantageously used as catalysts in the form of coatings on refractory supports of a convenient configuration. The catalysts resulting from the instant process can be coated onto refractory supports using conventional techniques. For example they can be preformed and applied to the support, or a reactive alumina already coated on a refractory support can be used in the instant process to obtain the catalytic product.

The supports can be of any compositions having softening or melting temperatures above the temperatures of use, and, if the catalysts are formed on the support, above the temperatures involved in the present process. For example, they can be composed solely or primarily of silica, natural silicious materials such as diatomaceous earths and pumice, alundum, silicon carbide, titania, zirconia, and other such refractory materials.

Particularly effective and durable catalysts for use in treating exhaust gases of internal combustion engines operating with leaded fuels are obtained when a product of the invention process is supported on refractory alumina support. The product can be applied to the surface, together with a binder, in an amount of about from 2% to 25% by weight of the support and can cover all or only a portion of the surface thereof.

The catalysts resulting from the instant invention are particularly attractive for the purification of automotive exhaust gases because of their stability under oxidizing and reducing conditions at high temperatures and because of their catalysis of relatively complete conversion of the undesirable components of automotive exhaust gases to innocuous substances. In this regard, gaseous streams having at least one oxidizable component and at least one reducible component selected from oxygen, hydrogen, carbon monoxide, hydrocarbons, and nitrogen oxides can be converted, using these catalysts, into at least one of water, carbon dioxide, nitrogen, and ammonia. The aluminum present along with a platinum metal in the complex metal oxide products of this process serves not only as an inexpensive diluent in the complex metal oxide but also helps impart a high degree of chemical and thermal stability to catalysts containing such oxides.

The products of the invention process which contain ruthenium are particularly attractive as catalysts for reducing nitrogen oxides since they generally catalyze the reduction of these oxides to innocuous compounds such as nitrogen instead of ammonia. The products containing platinum are particularly useful as catalysts for the complete oxidation of carbon compounds to carbon dioxide.

The invention is further illustrated by the following specific examples, in which parts are be weight unless indicated otherwise.

EXAMPLE 1

A portion of "Dispal" M reactive aluminum oxide monohydrate was heated at 950° C. for two hours to obtain a partially dehydrated reactive alumina. Twenty grams of the "Dispal" M was mixed with 200 milliliters of water containing 1.2 milliliters of commercial concentrated hydrochloric acid, 80 grams of the heated "Dispal" M reactive alumina was added, and the mixture was blended in a high-speed mixer and tumbled overnight in a jar. A cylinder of "Torvex" refractory alumina ceramic honeycomb support was soaked in water. This cylinder weighed 7.10 grams, was about 2.5 centimeters in diameter and thickness, and nominally had a cell size of 1/16 inch, wall thickness of 0.018 inches, open area of 50%, 253 hexagonal holes per square inch, and a nominal geometric surface area of 462 square feet per cubic foot. The water-soaked cylinder was dipped into the slurry of "Dispal" and partially dehydrated alumina, the gross excess of slurry was removed by blowing the cylinder with air, and the cylinder coated with the slurry was dried and then heated for about 30 minutes in a muffle furnace at about 650° C. The cooled coated cylinder was twice more soaked in water, dipped into the slurry, blown free of gross slurry, dried, and similarly heated, with a final heating for about two hours in the muffle furnace at about 650° C. The cylinder with adherent reactive alumina weighed 8.43 grams, corresponding to a coating of 15.8% of the total weight.

The coated "Torvex" alumina ceramic honeycomb cylinder coated with reactive alumina was immersed for about one hour in a boiling solution containing 4.0 grams of potassium hexachloroplatinate ($K_2PtCl_6 \cdot xH_2O$, 40% Pt), 2.14 grams of barium nitrate ($Ba[NO_3]_2$), and 32.0 grams of lanthanum nitrate ($La[NO_3]_3 \cdot 6H_2O$) in 400 milliliters of water, thereby impregnating the cylinder with the solution. The solution contained 0.004 grams per milliliter of platinum along with one atomic equivalent of barium and nine atomic equivalents of lanthanum per atomic equivalent of platinum. The dried impregnated coated cylinder was immersed for about 10 minutes at about 25° C. in a solution of 30 grams of potassium carbonate ($K_2CO_3$) in 270 milliliters of water, rinsed thoroughly with distilled water, and dried. The dried, coated, and impregnated cylinder was heated overnight in a muffle furnace in air at 950° C. The heated coated impregnated cylinder weighed 8.55 grams.

The completed catalyst was tested and found to exhibit excellent catalytic performance in the reduction of nitric oxide by carbon monoxide, the oxidation of carbon monoxide, and in the oxidation of propane.

EXAMPLE 2

The general procedure of Example 1 was repeated, except that six pieces of "Torvex" refractory alumina ceramic honeycomb each about 5.0 centimeters in diameter and 2.5 centimeters thick and weighing about 22 to 26 grams were used instead of the alumina cylinder of Example 1.

After coating with reactive alumina, impregnation with barium, lanthanum and platinum, treatment with potassium carbonate solution and heating, these six pieces of "Torvex" alumina ceramic honeycomb coated with catalyst were mounted in an insulated stainless steel chamber bolted to the exhaust port of a "Kohler" Model K91 single cylinder gasoline engine (8.86 cubic inch displacement, nominally 4 horsepower) fitted with an electronic spark ignition system and loaded with a heavy fan. The engine was operated at 3000 revolutions per minute at an air/fuel ratio of approximately 15.4 which resulted in exhaust gas containing approximately 1% excess oxygen, using an unleaded premium grade gasoline to which was added 2.0 grams per gallon of lead as "Motor Mix" tetraethyllead antiknock compound containing the usual amounts of ethylenedichloride and ethylenedibromide scavengers and a commercial premium grade heavy duty SAE 40 grade lubricating oil containing a typical combination of additives including phosphorus and sulfur. The engine was overhauled periodically. Under these operating conditions the conversion of carbon monoxide in the exhaust gas was tested at 100- hour intervals. The results are presented in the Table below.

TABLE

| Catalytic Activity With Automotive Exhaust Gases | |
|---|---|
| Hours Exposure | Percent Conversion of Carbon Monoxide With 1% Excess Oxygen |
| 0 | 60 |
| 100 | 85 |
| 200 | 87 |
| 300 | 86 |
| 400 | 91 |
| 500 | 91 |

EXAMPLE 3

About 8 grams of "Dispal" M reactive alumina was soaked overnight in about 100 milliliters of water containing 0.37 grams of ruthenium trichloride ($CRuCl_3 \cdot xH_2O$, 39.71% Ru), equivalent to 0.0015 grams per milliliter of ruthenium, and 0.61 grams of strontium nitrate ($Sr[NO_3]_2$) and 4.8 grams of lanthanum nitrate ($La[NO_3]_3 \cdot 5H_2O$), equivalent to 2 atomic equivalents of strontium and 8 atomic equivalents of lanthanum for each atomic equivalent of ruthenium. The alumina was dark brown and the filtrate was water white after separation by filtration. The separated alumina impregnated with metal compounds removed from the solution was dried overnight at 120° C. under reduced pressure, gently ground, heated for one hour at 800° C. and gently ground to obtain a catalytic composition.

To a slurry of 1.64 grams of "Dispal" M reactive alumina in 29 milliliters of water containing 3 drops of commercial concentrated hydrochlorice acid was added 12.3 grams of the catalytic composition. A cylinder of "Torvex" refractory alumina ceramic honeycomb similar to that described in Example 1 was soaked in water, dipped into the slurry, dried under reduced pressure, heated for about 30 minutes at 650° C., dipped again into the slurry, and heated over a weekend at 800° C. The resulting support with adherent catalytic composition and binder weighed 17.7% more than the dry uncoated support. The catalytic activity of this composition was tested and found to provide excellent performance in the reduction of nitric oxide by carbon monoxide, the oxidation of carbon monoxide, and the oxidation of propane.

EXAMPLE 4

About 14 grams of alumina pellets obtained from Rhone-Progil (bulk density 0.69 grams per cubic centimeter, surface area 74.6 square meters per gram determined with nitrogen by the Brunauer-Emmett-Teller method, pore volume 0.43 cubic centimeters and average pore diameter of 260.0 Angstroms) were soaked in a solution of 60 grams of potassium carbonate ($K_2CO_3$) in 540 milliliters of water and then dried. The pellets containing potassium carbonate were immersed for about 30 minutes at ambient temperature in the solution of potassium hexachloroplatinate, barium nitrate, and lanthanum nitrate described in Example 1, dried under reduced pressure, soaked in water for about five minutes, dried under reduced pressure, and heated overnight in a muffle furnace in air at 950° C.

The completed catalyst was tested and found to exhibit excellent catalytic performance in the reduction of nitric oxide by carbon monoxide, the oxidation of carbon monoxide, and the oxidation of propane.

I claim:
1. A process for preparing a catalyst comprising impregnating reactive alumina with a solution of metal compounds, thermally decomposable to metal oxides, in which said solution contains A. at least one compound of a platinum group metal in a concentration sufficient to impart to the alumina about 0.001% to 5% by weight of the platinum group metal;

B. at least one compound of a lanthanide metal of atomic number 57 to 71, inclusive, in an atomic amount between about 1 and 1000 times the atomic amount of the platinum group metal; and C. at least one compound of a metal selected from alkali and alkaline earth metals having ionic radii between about 0.9 and 1.65 Angstroms, in an atomic amount of about from 0.25 to 4 times the atomic amount of the platinum group metal; drying the resulting impregnated alumina and heating the resulting impregnated alumina at a temperature of at least about 800° C. for at least about one hour.

2. A process of claim 1 wherein the platinum metal is selected from platinum and ruthenium.

3. A process of claim 1 wherein the impregnated alumina is heated at a temperature of at least about 950° C.

4. A process of claim 1 further comprising converting the metal compounds impregnated into the alumina to insoluble compounds thermally decomposable to metal oxides before heating.

5. A process of claim 4 wherein the metal ions are converted to insoluble compounds by drying the impregnated alumina and dipping the impregnated alumina in a carbonate solution.

* * * * *